United States Patent [19]

Tobe

[11] Patent Number: 4,613,909
[45] Date of Patent: Sep. 23, 1986

[54] VIDEO SIGNAL RECORDING AND REPRODUCING SYSTEM

[75] Inventor: Kazumitsu Tobe, Kanagawa, Japan

[73] Assignee: Canon Kabushiki Kaisha, Tokyo, Japan

[21] Appl. No.: 452,501

[22] Filed: Dec. 23, 1982

[30] Foreign Application Priority Data

Dec. 28, 1981 [JP] Japan .............................. 56-213377

[51] Int. Cl.[4] ........................................... H04N 9/491
[52] U.S. Cl. .................................... 358/310; 358/314; 358/328; 358/329; 358/336; 360/33.1
[58] Field of Search .............. 358/310, 314, 329, 328, 358/21 R, 31, 335, 336, 340; 360/33.1

[56] References Cited

U.S. PATENT DOCUMENTS 3,812,523  5/1974  Narahara ............................ 358/328
4,376,289  3/1983  Reitmeier et al. .............. 358/314 X Primary Examiner—Robert L. Richardson
Attorney, Agent, or Firm—Toren, McGeady, Stanger, Goldberg & Kiel

[57] ABSTRACT

A video signal recording and reproducing system having image pick up means for converting an optical image to electrical signals, forming means for forming video signals from the electrical signals obtained from the image pick up means, recording and reproducing means for recording video signals on a recording medium and reproducing the video signals from the recording medium, delay means for producing input signals with a prescribed length of delay time, and change over means for incorporating the delay means into the forming means or the recording and reproducing means selectively.

23 Claims, 5 Drawing Figures

VIDEO SIGNAL RECORDING AND REPRODUCING SYSTEM

BACKGROUND OF THE INVENTION

1. Field of the Invention

The present invention relates to a video signal recording and reproducing system, especially to a video signal recording and reproducing system having image pick up means for converting an optical image into electrical signals and recording and reproducing means for recording video signals on a recording medium and reproducing the video signals from the recording medium integrally built therein.

2. Description of the Prior Art

Recently, developments of cameras using solid state image pick up plates, etc. for reducing their sizes and of small size magnetic video recording and reproducing apparatus (hereinafter called as VTR), have shown remarkable progress. Further, an integrated VTR having these means combined and integrally formed has been developed. Hereinafter, descriptions shall be made taking up such integrated VTR, etc., as examples.

In an integrated VTR, one horizontal scanning period delay element (hereinafter called 1HDL) is used in general for forming video signals from the above-mentioned signals from a camera. That is, in a camera in which an image pick up is performed by using a filter or filters for color separation, luminance signals and each chromatic signal are obtained by using a vertical correlation. Therefore, at least one 1HDL is used to obtain a vertical correlation.

On the other hand, also in VTR devices, 1HDL is used in a signal processing circuit for recording and in a processing circuit for the reproduced signals. For example, 1HDL is used in a circuit to separate luminance signals and chromatic signals, a drop out compensation circuit, and a circuit to remove crosstalk between adjacent tracks, etc.

However, a glass delay line is used in 1HDL employed in VTR, etc. in general, and, since it is large, there has been problems in actual mounting thereof in the VTR, etc.

On the other hand, such a 1HDL for video signal forming in a camera employs such a charge transfer device as CCD, etc. But the 1HDL employing a charge transfer device needs a driving clock.

As mentioned above, the 1HDL has constituted an obstacle in reducing the size of an apparatus such as VTR.

SUMMARY OF THE INVENTION

The present invention is, in view of the abovementioned problems, intended to reduce the size of a video signal recording and reproducing system.

In particular, it is an object of the present invention to reduce the number of delay means which cause input signals to be produced at its output with a delay in time, thus reducing the size of a system.

Further, it is another object of the present invention to effectively utilize such delay means as can be used in a wide band.

Other objects of the present invention than the above shall be made clear by detailed explanations of the drawings and embodiments of the invention to be given below.

DETAILED DESCRIPTION OF PREFERRED EMBODIMENTS

Figure 1:
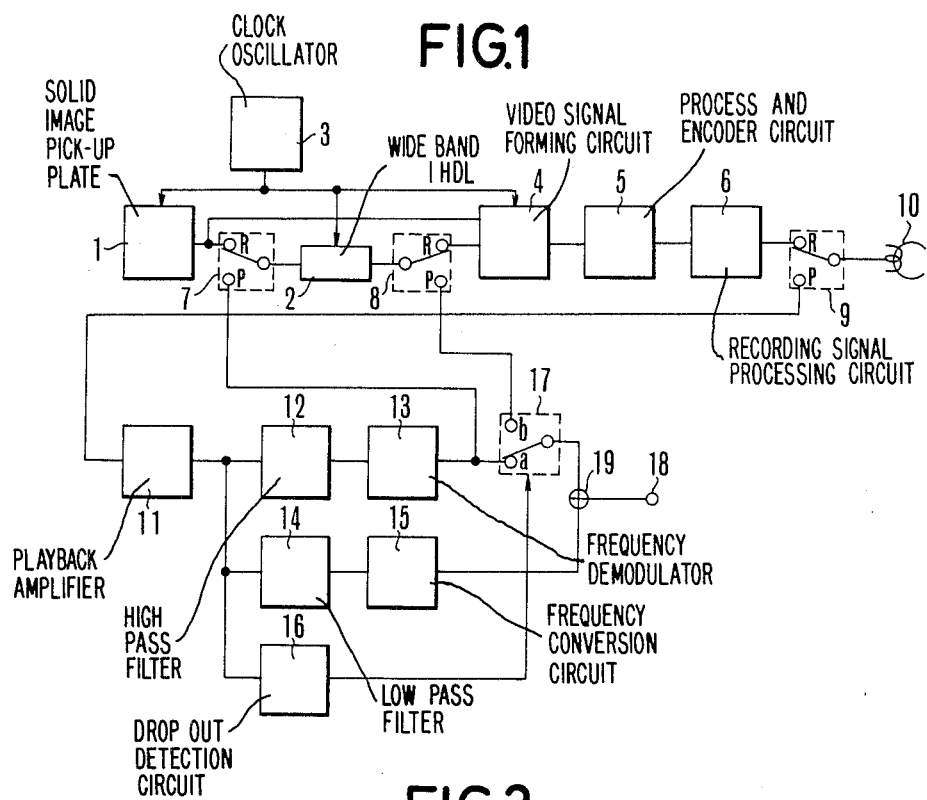
FIG. 1 is a drawing to show an example of a system of the present invention.

FIG. 1 is a drawing to show an integrated type of VTR as an example of a system of the present invention.

What is shown as 1 is a solid image pick up plate, 2 is a wide band 1HDL consisting of a charge transfer device, and 3 is an oscillator to generate clock signals and synchronizing signals for the solid-state image pick up plate 1 and the 1HDL 2. What is shown 4 is a video signal forming circuit, and 5 is a known type of process and encoder circuit, while 6 is a recording signal processing circuit for VTR. What is shown as 7, 8 and 9 are change over switches, and 10 is a magnetic head, while 11 is a playback amplifier. What is shown as 12 is a high-pass filter, and 13 is a frequency demodulator (hereinafter frequency demodulation shall be called as FM demodulation), while 14 is a low-pass filter. What is shown as 15 is a frequency conversion circuit, and 16 is a drop out detection circuit, while 17 is a change over switch controlled by outputs of the drop out detection circuit 16. What is shown as 18 is an output terminal for reproduced video signals, and 19 is a mixer.

When a video image photographed by the solid-state image pick up plate 1 is recorded as a video signal, the switches 7, 8 and 9 are connected to a recording side (R side in FIG. 1). First, the signals from the solid-state image pick up plate 1 being delayed by 1H and the same signals not being delayed will be introduced into the video signal forming circuit 4. The forming circuit 4 forms such signals as luminance signals and each color signal, etc., and supplies the same to the process and encoder circuit 5. Color video signals in a television signal form are obtained by said circuit 5. The color video signals are separated into luminance signals and chromatic signals within the recorded signal processing circuit 6, and the luminance signals will have frequency modulation (hereinafter called FM modulation) made thereon and the chromatic signals will have the frequency thereof converted to a lower band. The luminance signals with FM modulation and the chromatic signal with frequency thereof converted to a lower band are mixed and are recorded on a recording medium by the recording head 10.

Next, at a time of reproduction, the switches 7, 8 and 9 are connected to reproduction side terminals (P terminals in FIG. 1). Reproduced signals from the magnetic head 10 are introduced into the high-pass filter 12, the low-pass filter 14 and the drop out detection circuit 16 after being amplified by the playback amplifier 11. The luminance signals separated by the high-pass filter 12 are FM demodulated by the FM demodulator 13 and are sent to the a side terminal of the switch 17 and the P side terminal of the switch 7. The P side terminal of the switch 8 is connected to b side terminal of the switch 17 shown in the drawing, and such luminance signals as having 1H delay will be introduced thereto. The switch 17 is controlled by an output of the drop out detection circuit 16 and is ordinarily connected to the above-mentioned a side terminal, but will be connected to the above-mentioned b side terminal when a drop out takes place, for supplying such luminance signals with 1H delay as mentioned above to the mixer 19. On the other hand, the chromatic signals with their frequency converted to the lower band being separated by the low-pass filter 14 will have their frequency converted to their original high band by the frequency conversion circuit 15. The chromatic signals will be mixed with the luminance signals which have come through the switch 17 by the mixer 19. And the reproduced color video signals which are outputs of the mixer 19 will be produced from the terminal 18.

According to the above-mentioned arrangement, as the 1HDL used for signal processing to form video signals at a camera side at a time of recording is used for a drop out compensation at a time of reproduction, only one 1HDL will suffice.

Further, the 1HDL used to form video signals at a camera side is a 1HDL with a wide band which uses such a charge transfer devices as CCD, etc., and can correspond to signals of several MHz from direct current. Therefore, even when a drop out compensation is performed after FM demodulation as shown in the drawing, there will be no difficulties taking place. Contrary to this, if a drop out compensation is made in a 1HDL using conventional glass delay line, transient noises will be generated at a time of change over when FM demodulation is made as the drop out compensation is made before the FM demodulation, and extra circuits as a modulation circuit and a demodulation circuit, etc. must be provided before and after the 1HDL when the drop out compensation is performed after the FM demodulation. That is according to an arrangement of the present invention, not only can a number of the 1DHL be reduced by one, but there will be no noises generated at a time of change over or no extra circuits need to be provided. Also, a driving oscillator for charge transfer devices constituting this 1HDL employs the driving oscillator for the image pick up plate, therefore it is not necessary to provide an oscillator separately. It is therefore effective in reducing the size of the system.

Figure 2:
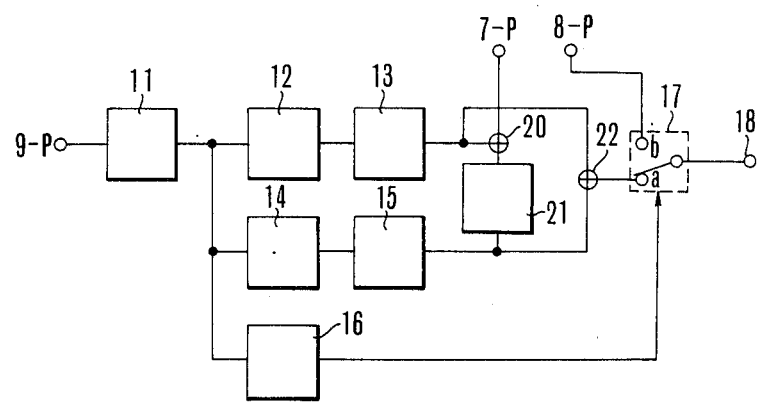
FIG. 2, FIG. 3, FIG. 4 and FIG. 5 are drawings to show other examples of systems of the present invention, respectively.

FIG. 2 is a drawing to show another example of a system of the present invention. Some components having the same function as that in FIG. 1 are identified with same numbers. Also, FIG. 2 shows a reproduction system only, wherein 7-P is connected to the reproduction side terminal of the switch 7 in FIG. 1, and what is shown as 8-P is connected to the reproduction side terminal of the switch 8 in FIG. 1, while 9-P is connected to the reproduction side terminal of the switch 9 in FIG. 1.

Since an operation at a time of a recording is exactly same as that in the case of FIG. 1, explanation shall be made only on an operation at a time of reproduction. Reproduced video signals amplified by the playback amplifier 11 have their FM modulated luminance signals separated by the high-pass filter 12, and have FM demodulation done thereon by the FM demodulator 13. On the other hand, chromatic signals with their frequency converted to a lower band and have been separated from the reproduced video signals by the low-pass filter 14 will have the frequency converted back to the original high band by the band modulator 15. The reproduced luminance signals being demodulated and reproduced chromatic signals being returned to a higher band are mixed in a mixer 22 and are sent to the a side terminal of the switch 17 in FIG. 2. Here, since a subcarrier has its phase inverted by 180° for every 1H, a hue thereof will become different if a drop out compensation is made by signals before the 1H.

Therefore, the reproduced chromatic signals have a phase of subcarrier inverted by a phase shifter 21 and are mixed with the above-mentioned reproduced luminance signals by a mixer 20. Then, thereafter the mixed signals will 1HDL made thereon and are sent to the b side terminal of the switch 17 in FIG. 2. The switch 17 is ordinarily connected to the above-mentioned a side terminal and ordinary reproduced color video signals are produced, but when a drop out takes place, reproduced color video signals with 1H delay will be produced.

In the example shown in FIG. 2, the 1HDL, which uses a charge transfer device used in a signal processing circuit for forming video signals at a camera side at a time of recording, is used for a drop out compensation at a time of reproduction, therefore, the number of the 1HDL can be reduced by one as mentioned above, further no noises will be generated at a time of change over, and it is not necessary to add extra circuits.

Figure 3:
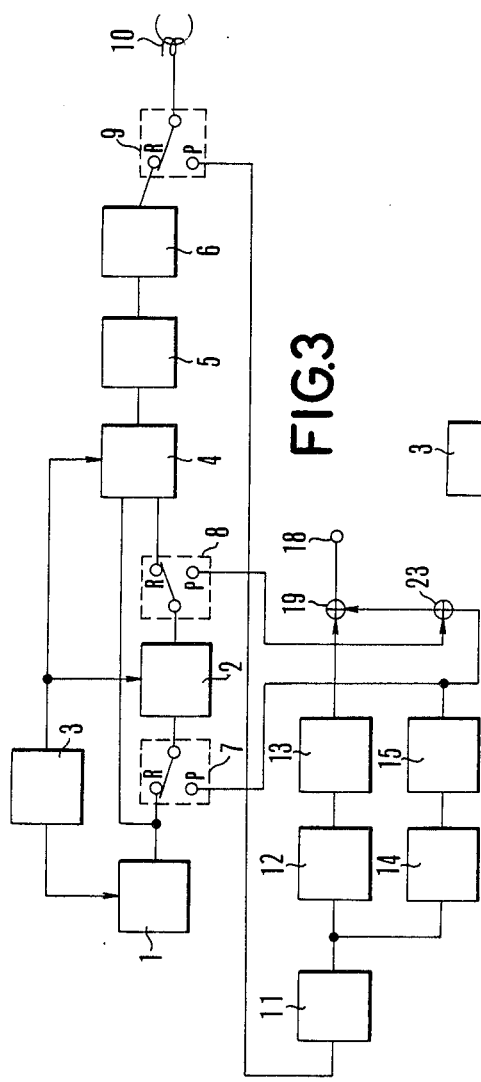

FIG. 3 is a drawing to show still another example of a system of the present invention. Similar component parts as those in FIG. 1 will have the same identification numbers. What are shown as 19, 23 are mixers, respectively. Here, explanation will be made also with respect to reproduction only.

The switch 7, 8 and 9 are connected to reproduction side terminals (P side terminals in FIG. 1). Reproduced video signals from the magnet head 10 are, after amplified by the playback amplifier 11, sent to the high-pass filter 12 and the low-pass filter 14. The FM modulated luminance signals within the reproduced video signals are separated by the high-pass filter 12 and will have FM demodulation by the FM demodulator 13. On the other hand, the chromatic signals with their frequency converted to a lower band are separated by the low-pass filter 14 and have their frequency converted to their original high band by the frequency converter 15 and a phase of a subcarrier will be shifted. The reproduced chromatic signals with their frequency converted are sent to the 1HDL 2 through the switch 7, and, after being delayed by 1H, are introduced into a mixer 23. On the other hand, the reproduced chromatic signals with frequency conversion are introduced into the mixer 23 directly, forming a comb shaped filter. That is the reproduced chromatic signals, which are the output of the mixer 23 have crosstalks removed and the same and the reproduced FM modulated luminance signals are mixed therewith in the mixer 19 and are made into reproduced color video signals and are sent to the terminal 18.

According to the above arrangement, one 1HDL can be used commonly in a signal processing circuit for forming video signals at a camera side and for crosstalk removal between the luminance signals and the chromatic signals at a time when video signals are reproduced. Further, said 1HDL employs a charge transfer device, therefore the 1HDL itself can have its size reduced.

Figure 4:
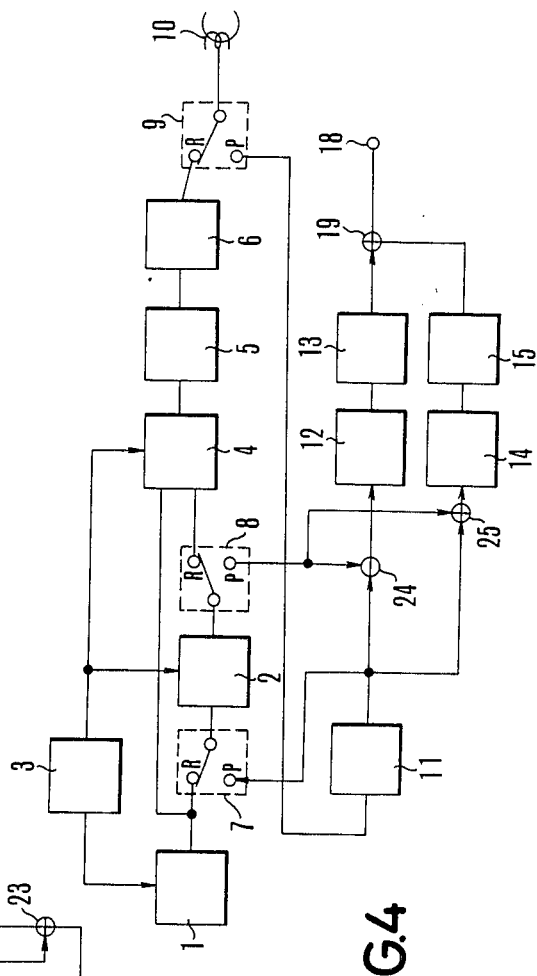

Also a comb shaped filter may also be used for other purposes than a crosstalk removal. For example, it may be used as separation means to separate FM modulated luminance signals and chromatic signals with their frequency converted to a lower band. FIG. 4 is a drawing to show an example of a case when a comb shaped filter is used for said separation means. Component parts having the same function as that in FIG. 1 are identified with the same numbers. What is shown as 24 is a subtracter circuit and 25 is an adder circuit.

By the above arrangement also, 1HDL may be used in common, and a number of the 1HDL used may be reduced by one as in the case of arrangement in FIG. 1, and the 1HDL used can have its size reduced.

As a circuit using a comb shaped filter, there are such signal processing circuits as PI type and PS type being known publicly and 1HDL is used therein, but 1HDL for processing signals from the camera at a time of a picture recording can be used in common, in the same manner as in the above-mentioned two examples.

Figure 5:
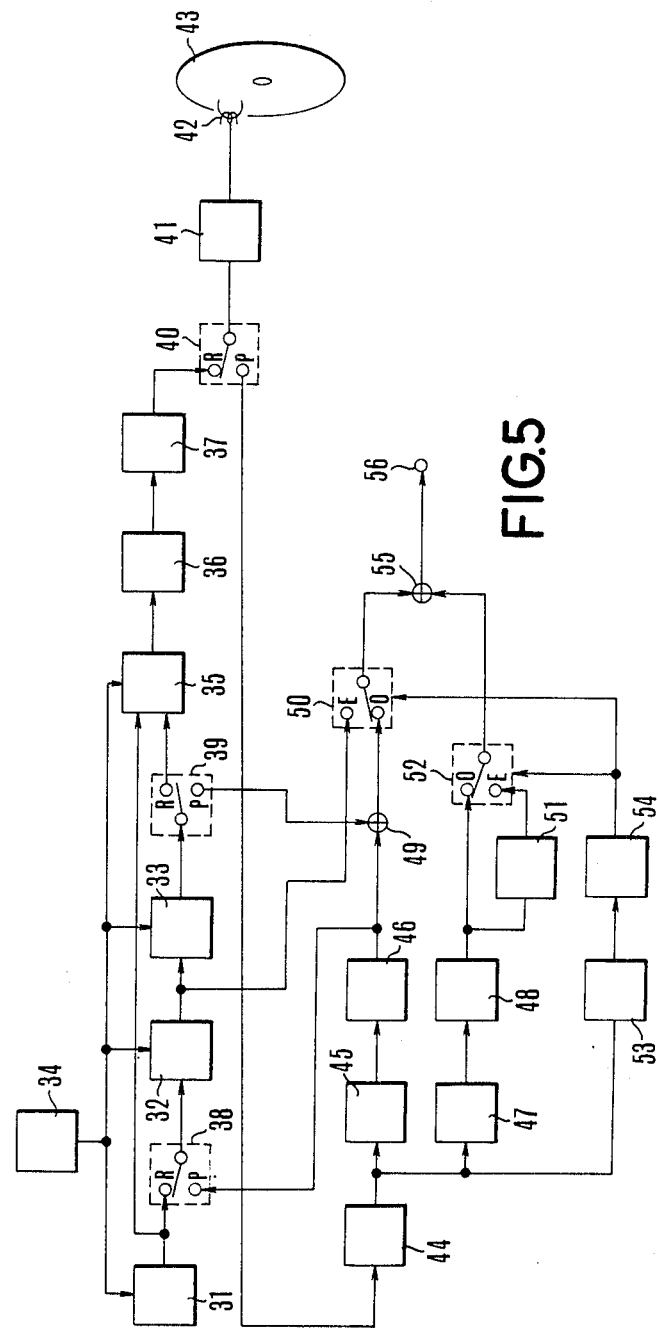

FIG. 5 is a drawing to another further example of a system of the present invention. In this example, the present invention is applied to a system in which video signals for one field much are taken out of video signals obtained by image pick up elements and said video signals for one field much are recorded on a round shape recording locus on a rotating magnetic sheet, and at the same time the recorded video signals for one field much are repeatedly reproduced thereby obtaining stationary video signals.

In FIG. 5, what is shown as 31 is a solid-state image pick up plate, and 32 and 33 are ½ HDL's comprising a charge transfer device, respectively, while 34 is an oscillator to supply clock signals and synchronizing signals to the solid-state image pick up plate 31 and the ½ HDL's 32, 33. What is shown as 35 is a video signal forming circuit, and 36 is a processing circuit.

First, explanation shall be made for an operation at a time of recording in this system. At a time of recording, switches 38, 39 and 40 are all connected to R side terminals shown in FIG. 5. First, signals obtained by the solid-state image pick up plate 31 having 1H delay by two ½ HDL's 32, 33, and the same signals without said delay are introduced into the video signal forming circuit 35. The signal forming circuit 35 forms such signals as luminance signals, etc., and these signals are supplied to the processing circuit 36 for obtaining luminance signals and two color difference signals. In a recorded signal processing circuit 37, the luminance signals and the two color difference signals as line sequential are subject to FM modulation, respectively. The band which is provided by said FM modulation will be such that the luminance signals will have higher bands than those for the line sequential color difference signals. And the FM modulated luminance signals and the FM modulated line sequential color difference signals are mixed and are supplied to a gate circuit 41 through R side terminal of a switch 40. In the gate circuit 41, such signals as corresponding to one field are gated and are recorded forming round shape recording locus on a rotating magnetic sheet 43.

At a time of reproduction, the switches 38, 39 and 40 are all connected to P side terminals shown in FIG. 5 and the gate 41 will have signals pass through the same unconditionally. Reproduced signals being reproduced at a head 42 are, after being amplified by a playback amplifier 44, supplied to a high-pass filter 45, a low-pass filter 47, and a vertical synchronizing separation circuit 53, respectively. FM modulated luminance signals being separated by the high-pass filter 45 are demodulated by an FM demodulator 46. What is shown as 49 is an adder to have an addition of demodulated luminance signals to the signals with 1H delay and the ones without 1H delay. The signals having the addition by the adder 49 are supplied to O side terminal of a switch 50, and the demodulated luminance signals with ½ H delay are supplied to an E side terminal of the switch 50.

On the other hand, the switch 50 is controlled by change over signals obtained by a change over signal producing circuit 54 in correspondence to vertical synchronizing signals separated by a vertical synchronizing separation circuit 53. This is done because when video signals for one field much corresponding to 262.5 H are continuously reproduced, if video signals equivalent to television signals constituting one frame with two fields are to be obtained, signals will not become continuous at a connection between a first field and a second field. Therefore, reproduced signals corresponding to signals in the second field are delayed by ½ H to secure a matched timing for horizontally synchronizing signals. Therefore, the switch 50 is connected to the O side terminal shown in FIG. 5 when reproduced signals to form signals of the first field are being obtained and is connected to E side terminal when reproduced signals to form signals of the second field are being obtained, respectively.

Now, since the same signals are placed in a first field and a second field in a system of this example, a resolution in a vertical direction is lower compared to that of ordinary television signals. Therefore, signals for the first field to form scanning lines located between adjacent scanning lines by the signals for the second field on a reproduced video plane are made by a sum (to be exact a mean value) of these two signals in the second field. The reproduced luminance signals with such processing are supplied to a mixer 55.

On the other hand, the line sequential color difference signals with FM modulation being separated by the low-pass filter 47 are demodulated by the FM demodulator 48. The demodulated line sequential color difference signals are supplied to a mixer 55 after the above-mentioned discontinuous compensation is done by the ½ HDL 51 and a switch 52 which is changed over in the same timing as that for the switch 50, in a same manner as for the luminance signals. The reproduced luminance signals and the reproduced line sequential color difference signals are mixed in the mixer 55 to obtain reproduced color video signals which are produced out of a terminal 56.

In the above-mentioned system also, a number of the 1HDL can be reduced by effectively utilizing the 1HDL. Also in this example, as the 1HDL with a wide band can be conveniently utilized, luminance signals after FM demodulation can be processed.

As has been explained above, according to the present invention, a number of delay means is reduced, and especially small size wide band delay lines are effectively used without using large size delay lines, thus providing a great effect in reducing size and enhancing efficiencies of a system.

What we claim:

1. A video signal recording and reproducing system, comprising:
   (a) image pick-up means for converting optical images to an electrical signal;
   (b) separating means for separating color signals from the electrical signal obtained by said image pick-up means;
   (c) forming means for forming a video signal which includes a luminance signal and a chrominance signal by using the color signals;
   (d) recording means for recording the video signal on a recording medium;

(e) reproducing means for reproducing the video signal from the recording medium, said reproducing means including a processing circuit to handle the video signal;

(f) delay means for producing input signals with a predetermined period of delay; and (g) changeover means for incorporating said delay means selectively into said separating means and said processing circuit.

2. A system according to claim 1, wherein said changeover means incorporates said delay means into said separating means when said image pick-up means is in operation and incorporates said delay means into said processing circuit when said reproducing means is in operation.

3. A system according to claim 2, wherein said processing circuit includes a dropout compensation circuit to make a compensation for a dropout of the video signal and said changeover means incorporates said delay means into said dropout compensation circuit when said reproducing means is in operation.

4. A system according to claim 3, wherein said dropout compensation circuit replaces the dropout portion of the luminance signal with another portion of the luminance signal.

5. A system according to claim 3, wherein said dropout compensation circuit replaces the dropout portion of the video signal containing the luminance signal and the chrominance signal with another portion of the video signal.

6. A system according to claim 2, wherein said delay means produces input signals with a delay for one horizontal scanning period of the video signal.

7. A system according to claim 2, wherein said delay means comprises a charge transfer device.

8. A system according to claim 7, wherein said image pick-up means comprises a charge transfer device.

9. A system according to claim 8, further comprising driving means for driving both the charge transfer device in said image pick-up means and the charge transfer device in said delay means.

10. A system according to claim 2, wherein said processing circuit includes a comb filter and said changeover means incorporates said delay means into said comb filter when said reproducing means is in operation.

11. A system according to claim 10, wherein said processing circuit includes a separation circuit to separate the luminance signal and the chrominance signal from the video signal, said separation circuit including said comb filter.

12. A system according to claim 10, wherein said processing circuit includes a removal circuit to remove unnecessary signals contained in the chrominance signal, said removal circuit including said comb filter.

13. A system according to claim 2, wherein said processing circuit includes an interpolation circuit to interpolate the video signal for improving a resolution and said changeover means incorporates said delay means into said interpolation circuit when said reproducing means is in operation.

14. A video signal recording and/or reproducing system, comprising:

(a) image pick-up means for converting optical images to the electrical signals, said image pick-up means including a charge transfer device;

(b) separating means for separating color signals from the electrical signal obtained by said image pick-up means;

(c) forming means for forming a video signal which includes a luminance signal and a chrominance signal by using the color signals;

(d) recording and/or reproducing means for recording the video signal on a recording medium and/or for reproducing the video signal from the recording medium, said recording and/or reproducing means including a processing circuit to handle the video signal;

(e) delay means for delaying at least part of the video signals, said delay means being incorporable into said processing circuit and including a charge transfer device; and (f) clock generation means for generating a clock signal driving both the charge transfer device of said image pick-up means and the charge transfer device of said delay means.

15. A system according to claim 14, wherein said processing circuit includes a dropout compensation circuit and said delay mean is incorporable into said dropout compensation circuit.

16. A system according to claim 14, wherein said processing circuit includes a comb filter and said delay means is incorporable into said comb filter.

17. A system according to claim 16, wherein said processing circuit includes a separation circuit to separate the luminance signal and the chrominance signal from the video signal, said separation circuit including said comb filter.

18. A system according to claim 16, wherein said processing circuit includes a removal circuit to remove unnecessary signals contained in the chrominance signal, said removal circuit including said comb filter.

19. A system according to claim 14, wherein said processing circuit includes an interpolation circuit to interpolate the video signal for improving resolution and said delay means is incorporable into said interpolation circuit.

20. A system according to claim 14, wherein said delay means is incorporable further into said separating means.

21. A system according to claim 14, wherein the clock signal generated by said clock generation means is used for determining the timing of the video signal forming operation of said forming means.

22. A video signal recording and/or reproducing system, comprising:

(a) image pick-up means for converting optical images to electrical signals;

(b) separating means for separating color signals from the electrical signal obtained by said image pick-up means;

(c) forming means for forming a video signal which includes a luminance siganl and a chrominance signal by using the color signals;

(d) recording and/or reproducing means for recording the video signal on a recording medium and/or for reproducing the video signal from the recording medium, said recording and/or reproducing means including a processing circuit to handle the video signal; and (e) clock generation means for generating a clock signal to determine the timing of the operations of both said image pick-up means and said recording and/or reproducing means.

23. A system according to claim 22, wherein the clock signal generated by said clock generation means is used for determining the timing of the video signal forming operation of said forming means.

* * * * *